United States Patent
Korber et al.

(10) Patent No.: US 11,774,253 B2
(45) Date of Patent: Oct. 3, 2023

(54) REACTIVE OPERATIONS TO AIR POLLUTION

(71) Applicant: Google LLC, Mountain View, CA (US)

(72) Inventors: Ran Korber, Yokne'am Illit (IL); Emil Fisher, Kiryat Yam (IL)

(73) Assignee: Google LLC, Mountain View, CA (US)

( * ) Notice: Subject to any disclaimer, the term of this patent is extended or adjusted under 35 U.S.C. 154(b) by 55 days.

(21) Appl. No.: 16/787,570

(22) Filed: Feb. 11, 2020

(65) Prior Publication Data
US 2021/0247198 A1 Aug. 12, 2021

(51) Int. Cl.
*G01C 21/34* (2006.01)
*E05F 15/70* (2015.01)
*B60H 1/00* (2006.01)

(52) U.S. Cl.
CPC ..... *G01C 21/3453* (2013.01); *B60H 1/00771* (2013.01); *E05F 15/70* (2015.01); *E05Y 2400/44* (2013.01); *E05Y 2400/45* (2013.01); *E05Y 2900/55* (2013.01)

(58) Field of Classification Search
None
See application file for complete search history.

(56) References Cited

U.S. PATENT DOCUMENTS

| 2013/0151133 A1* | 6/2013 | Kickbusch | B61L 27/16 701/117 |
| 2016/0117372 A1* | 4/2016 | Krafft | G06F 3/04883 715/739 |
| 2016/0318368 A1* | 11/2016 | Alger | G01C 21/3453 |
| 2017/0274737 A1* | 9/2017 | Delaruelle | B60H 1/00764 |

FOREIGN PATENT DOCUMENTS

KR  20060063222 A  *  6/2006

OTHER PUBLICATIONS

Translation of KR20060063222A (Year: 2003).*

* cited by examiner

*Primary Examiner* — Rachid Bendidi
*Assistant Examiner* — Selena M Jin
(74) *Attorney, Agent, or Firm* — Lerner David LLP

(57) ABSTRACT

A method, an apparatus and a computer program product for performing reactive ventilation or prevention operations to air pollution in a moving vehicle. The method comprises obtaining a driving path of the vehicle that comprises a future sub-path that the vehicle is expected to arrive to at a future time, an estimated time-window the vehicle is expected to be located thereon, and air pollution data of the driving path that comprises an air pollution level at the future sub-path. In response to predicting, based on the air pollution data and the driving path, that the vehicle is about to encounter air pollution at the future sub-path, a prevention action is performed prior to the vehicle reaching the future sub-path. In response to a determination that the estimated air pollution level is below a threshold, performing a ventilation action while the vehicle is located on the future sub-path.

17 Claims, 4 Drawing Sheets

REACTIVE OPERATIONS TO AIR POLLUTION

TECHNICAL FIELD

The present disclosure relates to reactive operations to air pollution in general, and to reactive operations to air pollution in a moving vehicle, in particular.

BACKGROUND

Air pollution is one of the biggest threats for the environment that affects everyone: humans, animals, crops, cities, forests, aquatic ecosystems and more. Air pollution occurs when harmful or excessive quantities of substances including gases, particles, and biological molecules are introduced into Earth's atmosphere. Exposure to air pollution poses serious health risks and even endangers lives. Air pollution may cause diseases, allergies and even death to humans. Exposure to air pollution is particularly dangerous for vulnerable populations such as children, elderly, pregnant women, and people with heart and respiratory diseases. Air pollution may also cause harm to other living organisms such as animals and food crops, and may damage the natural or built environment.

Air pollution sensors and data services are utilized to provide information regarding air pollution. Air pollution sensors detect and monitor the presence of air pollution in the surrounding area. Air pollution sensors can be used indoor, such as inside a house or a car, and outdoor environments, such as within a predefined area. Air pollution data services monitor air pollution data per location. Air pollution data services may utilize different air pollution sensors, analyze information from other data services, and the like.

BRIEF SUMMARY

One exemplary embodiment of the disclosed subject matter is a method comprising: obtaining a driving path of a vehicle, wherein the driving path comprises a at least one future location that the vehicle is expected to arrive to at a future time; obtaining air pollution data, wherein the air pollution data comprises an air pollution level at the at least one future location; predicting, based on the air pollution data and based on the driving path, that the vehicle is about to encounter air pollution at the at least one future location; and in response to said predicting, performing a prevention action prior to the vehicle reaching the at least one future location.

Optionally, wherein said predicting comprises determining that an air pollution level is above a predetermined threshold.

Optionally, said predicting comprises: estimating an arrival time of the vehicle to the at least one future location; and predicting, based on the air pollution data, an estimated air pollution level at the at least one future location at the arrival time.

Optionally, said performing the prevention action is performed at least a predetermined time prior to the vehicle reaching the at least one future location.

Optionally, the prevention action comprises performing at least one of: turning on an air purifier inside the vehicle; closing one or more windows of the vehicle; turning on an air conditioning of the vehicle; and modifying a circulation of the air conditioning of the vehicle to circulate internal air within the vehicle.

Optionally, the prevention comprises delaying an arrival of the vehicle to the at least one future location.

Optionally, the prevention action is configured to prevent the air pollution at the at least one future location to reach a passenger cabin of the vehicle.

Optionally, said predicting is further performed based on historical pollution data along the driving path.

Optionally, said predicting is performed based on real-time pollution data along the driving path.

Another exemplary embodiment of the disclosed subject matter is a method comprising: obtaining a driving path of a vehicle, wherein the driving path comprises a future sub-path that the vehicle is expected to arrive to at a future time; estimating a time window when the vehicle is expected to be located on the future sub-path; predicting an estimated air pollution level at the future sub-path within the time window; and in response to a determination that the estimated air pollution level is below a threshold, performing a ventilation action while the vehicle is located on the future sub-path.

Optionally, the ventilation action comprises performing at least one of: opening one or more windows of the vehicle; turning on an air conditioning of the vehicle; and modifying a circulation of the air conditioning of the vehicle to circulate external air into the vehicle.

Optionally, the ventilation action is configured to decrease an air pollution level inside a passenger cabin of the vehicle.

Optionally, the threshold is based on an air pollution level at a passenger cabin of the vehicle.

Optionally, the air pollution level at the passenger cabin of the vehicle is determined using a sensor within the vehicle.

Optionally, the air pollution level at the passenger cabin of the vehicle is determined based on a second air pollution level at a second passenger cabin of a second vehicle, wherein the second vehicle drives in the driving path of the vehicle, wherein the vehicle and the second vehicle have a same ventilation status.

Optionally, the air pollution level at the passenger cabin of the vehicle is determined using a cloud-based service, wherein the cloud-based service providing air pollution measurements in different geographic locations.

Optionally, said predicting the estimated air pollution level comprises: predicting a plurality of estimated air pollution levels along several locations within the future sub-path at respective expected arrival times thereto; and computing the estimated air pollution level based on the plurality of estimated air pollution levels along the several locations.

Optionally, the method further comprises stopping the ventilation action, wherein said stopping is performed before the vehicle exits the future sub-path.

Yet another exemplary embodiment of the disclosed subject matter is a computerized apparatus having a processor, the processor being adapted to perform the steps of: obtaining a driving path of a vehicle, wherein the driving path comprises a at least one future location that the vehicle is expected to arrive to at a future time; obtaining air pollution data, wherein the air pollution data comprises an air pollution level at the at least one future location; predicting, based on the air pollution data and based on the driving path, that the vehicle is about to encounter air pollution at the at least one future location; and in response to said predicting, performing a prevention action prior to the vehicle reaching the at least one future location.

Yet another exemplary embodiment of the disclosed subject matter is a computerized apparatus having a processor, the processor being adapted to perform the steps of: obtaining a driving path of a vehicle, wherein the driving path comprises a future sub-path that the vehicle is expected to arrive to at a future time; estimating a time window when the vehicle is expected to be located on the future sub-path; predicting an estimated air pollution level at the future sub-path within the time window; and in response to a determination that the estimated air pollution level is below a threshold, performing a ventilation action while the vehicle is located on the future sub-path.

Yet another exemplary embodiment of the disclosed subject matter is a computer program product comprising a non-transitory computer readable storage medium retaining program instructions, which program instructions when read by a processor, cause the processor to perform a method comprising: obtaining a driving path of a vehicle, wherein the driving path comprises a at least one future location that the vehicle is expected to arrive to at a future time; obtaining air pollution data, wherein the air pollution data comprises an air pollution level at the at least one future location; predicting, based on the air pollution data and based on the driving path, that the vehicle is about to encounter air pollution at the at least one future location; and in response to said predicting, performing a prevention action prior to the vehicle reaching the at least one future location.

Yet another exemplary embodiment of the disclosed subject matter is a computer program product comprising a non-transitory computer readable storage medium retaining program instructions, which program instructions when read by a processor, cause the processor to perform a method comprising: obtaining a driving path of a vehicle, wherein the driving path comprises a future sub-path that the vehicle is expected to arrive to at a future time; estimating a time window when the vehicle is expected to be located on the future sub-path; predicting an estimated air pollution level at the future sub-path within the time window; and in response to a determination that the estimated air pollution level is below a threshold, performing a ventilation action while the vehicle is located on the future sub-path.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
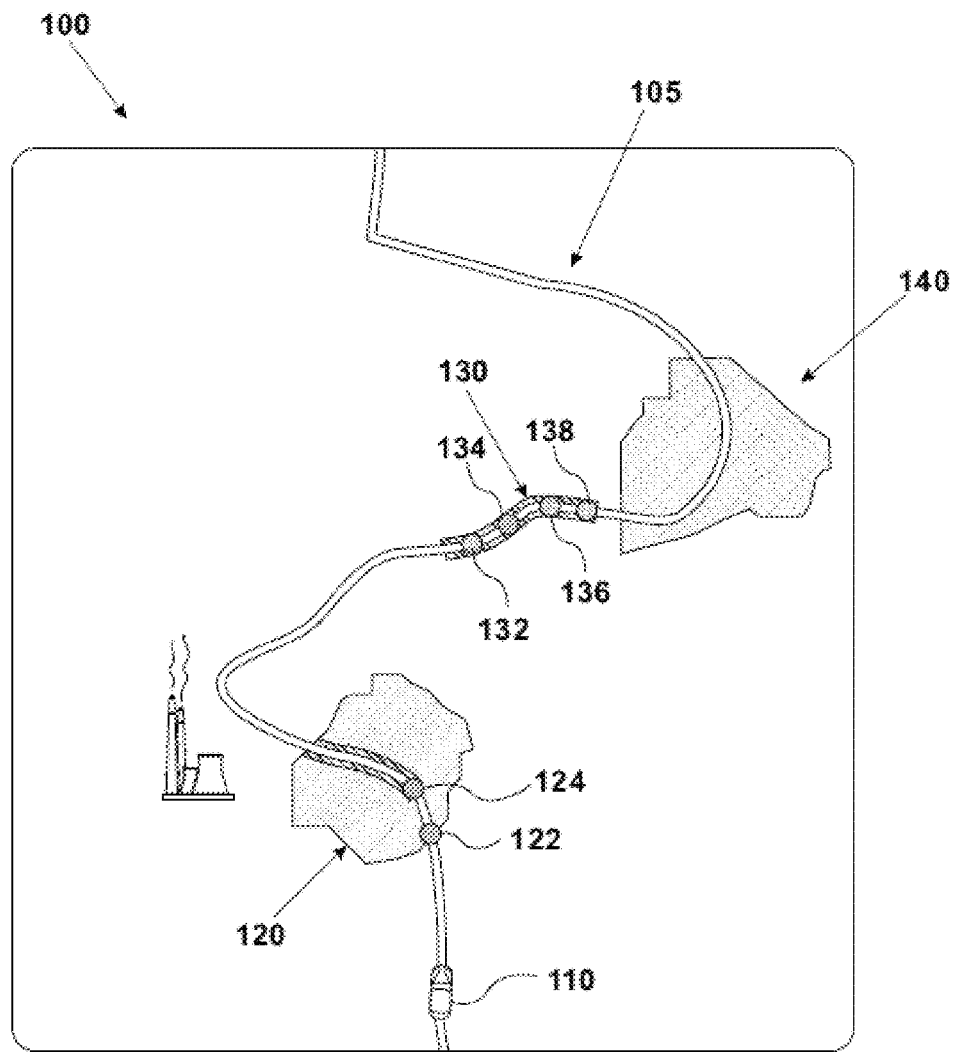
FIG. 1 shows a schematic illustration of an exemplary map, in accordance with some exemplary embodiments of the disclosed subject matter.

One technical problem dealt with by the disclosed subject matter is to reduce health risk to passengers on a vehicle. The health risk associated with exposing to air pollution in mobile locations such as in a vehicle may be even more harmful than in stationary locations such as indoor, inside houses, or the like. The information about air pollution may be obtained both from local sensors that may be located inside a house, inside a vehicle, or the like, or from data services that provide air-quality measurements per location. The challenge is to use such information, to automatically reduce the health risk to the subjects in the vehicle. In some cases, the subjects may be already located in a polluted area, and an action to treat the existing pollution may be required. In other cases, it may be desired to prevent the air pollution from reaching the subjects.

In some cases, the action may be to turn on an air purifier, thus preventing/treating pollution. This can prevent the pollution level from reaching a threshold quality score. The air purifier may be turned on automatically according to the current air quality levels at the air purifier's location (such as home, car, or the like).

One technical solution is to perform an air pollution prevention action prior to the vehicle reaching a location with high air pollution. In some exemplary embodiments, the vehicle may be predicted to encounter air pollution at a future location, based on the air pollution data along the driving path thereof. The driving path of the vehicle may comprise a future location that the vehicle is expected to arrive thereto at a future time, which may be predicted to encounter air pollution. In some exemplary embodiments, an arrival time of the vehicle to each location on the driving path, may be determined. An estimated air pollution level at each location on the driving path, at the associated arrival time thereto may be predicted. The prediction may be performed based on historical pollution data along the driving path, based on monitored real-time pollution levels along the driving path, or the like. Locations having an air pollution level above a predetermined threshold may be determined to encounter air pollution and be risky to passengers of the vehicle. The predetermined threshold may be set in accordance with the demographic characters of the passengers of the vehicle, based on health characters of the passengers, may be manually set by a user, a driver or a passenger of the vehicle, or the like. Additionally or alternatively, the predetermined threshold may be set based on the lowest air pollution level within the vehicle along the driving path. Additionally or alternatively, the predetermined threshold may be set in an absolute manner, such as based on recommendations of authorities, or the like.

In some exemplary embodiments, the air pollution prevention action may be configured to prevent the air pollution predicted at the future location to reach a passenger cabin of the vehicle. The prevention actions may be performed at least a predetermined time prior to the vehicle reaching the at least one future location. The predetermined time may be a time period large enough to prevent the air pollution from reaching the passenger cabin, such as about 10 minutes, about 5 minutes, or the like. Additionally or alternatively, the predetermined time may be determined based on the prevention action and the time it is predicted to take, the severity of the air pollution, or the like. In some exemplary embodiments, the prevention action may comprises performing at least one of: turning on an air purifier inside the vehicle, closing one or more windows of the vehicle, turning on an air conditioning of the vehicle, modifying a circulation of the air conditioning of the vehicle to circulate internal air within the vehicle, or the like. Additionally or alternatively, the prevention action may comprise delaying an arrival of the vehicle to the location with the air pollution, until the air pollution level is reduced, such as by slowing down the vehicle, making a stop at a station with a lower air pollution level, or the like.

Another technical solution is to perform a ventilation action when the vehicle arrives to a location with a lower air pollution level. In some exemplary embodiments, the vehicle may be predicted to arrive to a location with enhanced air quality, based on the air pollution data along the driving path thereof. The driving path may comprise a future sub-path that the vehicle is expected to arrive to at a future time with an estimated air pollution level below a threshold. The threshold may be based on an air pollution level at a passenger cabin of the vehicle. As an example, the threshold may be equal to the air pollution level at a passenger cabin, below the air pollution level at a passenger cabin, or the like, in order to enable reducing the air pollution level in the passenger cabin. In some exemplary embodiments, the air pollution level at the passenger cabin may be determined based on sensor readings within the vehicle. Additionally or alternatively, the air pollution level at the passenger cabin of the vehicle may be determined using a cloud-based service providing air pollution measurements in different geographic locations, such as BreezoMeter™. Additionally or alternatively, in the absence of an air quality or a pollution sensor, the air pollution level at a passenger cabin may be determined based on one or more air pollution levels of similar vehicles on the same driving path, such as vehicles from the same fleet of the vehicle that share information with the vehicle, crowdsourced air pollution levels from passengers from similar vehicles with the same driving path, or the like. The vehicle and the other vehicle providing the air pollution level may be required to have a same ventilation status. As an example, the other vehicle may be driving over the same driving path, sharing the same properties such as size and windows shape, performing the same ventilation habits, such as driving with opened/closed window, with the same A/C activation and circulation, or the like.

In some exemplary embodiments, a time window at when the vehicle is expected to be located on the future sub-path may be determined. An estimated air pollution level at the future sub-path within the time window may be predicted. In some exemplary embodiments, a plurality of estimated air pollution levels along several locations within the future sub-path at respective expected arrival times thereto may be predicted. The estimated air pollution level may be computed based on the plurality of estimated air pollution levels along the several locations.

In some exemplary embodiments, the ventilation action may be performed during the time that the vehicle is located on this future sub-path, in order to decrease the air pollution level inside a passenger cabin of the vehicle. The ventilation action may comprise performing at least one of: opening one or more windows of the vehicle, turning on an air conditioning of the vehicle, modifying a circulation of the air conditioning of the vehicle to circulate external air into the vehicle, or the like. The ventilation action may be terminated before the vehicle exits the future sub-path.

In some exemplary embodiments, the prevention actions and the ventilation actions may be similar, opposites, or the like. As an example, when a prevention action is performed, the associated ventilation action may be terminated. Additionally or alternatively, the prevention actions and the ventilation actions may be simultaneously an automatically performed or terminated based on the air pollution levels inside and outside the vehicle. As an example, windows may be opened or closed automatically according to the current air pollution levels at the current location. When a window is open, internal air quality may reach the external air quality over time. If the external air pollution level is above the threshold, or above the internal air pollution level, the windows may be closed automatically. If the external air pollution level is below the internal air pollution level, the windows may be opened automatically. Additionally or alternatively, the windows may be automatically opened if the external air pollution level is both lower that the internal air pollution level and below a predetermined threshold. As another example, Air conditioner (A/C) can also affect air quality. A/C can use external air in its operation, and accordingly may affect the air quality in a similar manner to a window. In some cases, the A/C may be activated or turned off automatically according to the current air pollution levels inside and outside the vehicle. Additionally or alternatively, the A/C may be instructed to change its circulation property, to circulate the air in or out of the vehicle, automatically according to the current air pollution levels. Similarly, the vehicle windows may be opened, A/C turned on or circulation turned off, when the external air quality is higher than the internal air quality, in the current location of the car and in the succeeding locations along the driving path of the car, so as to allow the ventilation of the car, to increase the internal air quality. As yet another example, an air purifier inside the vehicle may be automatically turned on or off in accordance with the air pollution level. When the vehicle is predicted to drive through a polluted area, prior to reaching the polluted area, the air purifier may be automatically turned on. Simultaneously, the windows may be automatically closed, the A/C may be automatically turned off or modified to circulate the internal air, before the vehicle reaches the polluted area.

In some exemplary embodiments, a user, such as the driver of the vehicle, the owner, the passengers, or the like, may be notified of relevant information regarding to the air pollution. As an example, the user may be notified when the vehicle parks in a polluted area, and accordingly may avoid exiting the vehicle. As another example, the user may be notified when the vehicle drives through a polluted area (or about to drive through), when the vehicle exits the polluted area, or the like. As yet another example, special notifications may be issued to special passengers, such as vulnerable passengers, children, elderly, pregnant women, people with heart and respiratory diseases, or the like. Additionally or alternatively, a recommendation for air filter replacement may be issued based on the vehicle's actual exposure to pollution.

It may be noted that the air pollution level may be determined based on the amount of one or more pollutants in the air, different types of pollutants, pollutants of different sizes, or the like. Different air pollution measurements may indicate different types of air pollution, such as indicating different types of pollutants (such as Ammonia, odor, Nitrogen Dioxide (NO2), ground-level Ozone (O3), particulates, Ozone, Sulfur Dioxide (SO2), Carbon Monoxide (CO), Benzene, combinations therebetween, or the like. Additionally or alternatively, Different air pollution measurements may indicate different subtypes of atmospheric particles having different diameters, such as between 2.5 and 10 micrometers (μm) (PM10), fine particles with a diameter of 2.5 μm or less (PM2.5), ultrafine particles, or the like. In some exemplary embodiments, different pollutants may affect different people differently. Accordingly, in some exemplary embodiments, the air pollution level in the passenger cabin, the air pollution level in the future sub-path, the relevant threshold, or the like, may be determined to be in the same type of measurement (e.g. the same pollutants, the same PM, or the like). The type of the measurement may be determined based on demographic characters of the passengers of the vehicle, based on health characters of the passengers, or the like.

One technical effect of utilizing the disclosed subject matter is transforming the composition of the air inside a vehicle to reduce pollens. The disclosed method automatically changes the composition of the air inside the vehicle, based on outdoor air pollution levels in real time without a direct human intervention. The disclosed method can accurately track the passenger exposure to outdoor air pollution in real time, at the exact location, even when the passenger is riding a driving vehicle.

Another technical effect of utilizing the disclosed subject matter is utilizing the power of big data for air quality and pollen to for smart mobility. The big data may be utilized for preventing in-cabin contamination, improve health and well-being of the passengers, avoiding health crisis, and the like. The big data may comprise air quality data, pollen and fire information, weather information, or the like. The disclosed method may automatically prevent passenger exposure to harmful pollution, by automatically making decisions for the passenger's own health, without a direct human intervention.

It will be appreciated that the disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing a schematic illustration of an exemplary map, in accordance with some exemplary embodiments of the disclosed subject matter.

In some exemplary embodiments, Map 100 may represent a Driving Path 105 of a Vehicle 110.

In some exemplary embodiments, Vehicle 110 may be expected to arrive to Polluted Area 120 at a first future time. An air pollution data comprising air pollution levels at several locations in Polluted Area 120 may be obtained. The air pollution data may be obtained from sensors located within Polluted Area 120. The sensors may be configured to monitor or measure air pollutant concentration of one or more pollutants. Additionally or alternatively, the air pollution data may be obtained from data services that may combine measured data over a specified averaging period, obtained from an air monitor or model, to determine the dose of the air pollutant.

Additionally or alternatively, the air pollution data may be predicted based on other data related to Polluted Area 120, such as the existence of pollution sources nearby Polluted Area 120 (such as Plant 125), active hours of such pollution sources, traffic information, wind speed and direction, temperature inversion, or the like. As an example, the air pollution level may decrease due to an increase of air emissions (such as during rush hour traffic or when there is an upwind forest fire) or from a lack of dilution of air pollutants. As another example, stagnant air, such as caused by an anticyclone, temperature inversion, or low wind speeds, may cause air pollution to remain in a local area, leading to high concentrations of pollutants, chemical reactions between air contaminants and hazy conditions, or the like. Additionally or alternatively, the air pollution data may be predicted based on historical air pollution data in Polluted Area 120. As an example, Polluted Area 120 may be determined to be polluted at the arrival time (e.g., the first future time) to Location 122, based on historical air pollution levels indicative of high air pollution at similar time windows.

In some exemplary embodiments, a prevention action may be automatically performed prior to Vehicle 110 reaching Polluted Area 120, such as in Location 122. The prevention action may be configured to prevent the air pollution in Polluted Area 120 to reach a passenger cabin of Vehicle 110.

In some exemplary embodiments, Vehicle 110 may be expected to arrive to Clean Area 130 at a second future time. The second future time may be within an estimated time window that the vehicle is expected to be located in Clean Area 130. The estimated time window may be determined based on the estimated arrival time to Clean Area 130 (e.g., second future time), the time required to drive within Clean Area 130, the sub-path of Path 105 within Clean Area 130, or the like.

In some exemplary embodiments, Clean Area 130 may comprise a plurality of location, such as Locations 132-138. A respective arrival time to each location of Locations 132-138 may be determined. An estimated air pollution level at each location of Locations 132-138 at respective expected arrival times thereto may be predicted. An estimated air pollution level at Clean Area 130 within the time window may be computed based on the estimated air pollution levels along Locations 132-138.

In response to a determination that the estimated air pollution level at Clean Area 130 is below a threshold (such as below the air pollution level at a passenger cabin of the vehicle), a one or more ventilation action may be automatically performed while Vehicle 110 is located within Clean Area 130. The one or more ventilation actions may be configured to decrease an air pollution level inside a passenger cabin of Vehicle 110. As an example, one or more windows of Vehicle 110 may be automatically opened, an air conditioning of Vehicle 110 may be automatically turned off, a circulation of the air conditioning of Vehicle 110 may be modified to circulate external air into Vehicle 110, or the like.

In some exemplary embodiments, the one or more ventilation actions may be terminated before existing Clean Area 130, such as on Location 138. Additionally or alternatively, Vehicle 110 may be expected to arrive to Polluted Area 140 at a third future time, after existing Clean Area 130. In addition to automatically terminating the one or more ventilation actions, a one or more prevention actions, similar to the actions automatically performed in Polluted Area 120, may be automatically performed. As an example, an air purifier inside Vehicle 110 may be turned on, one or more windows of Vehicle 110 may be closed, an air conditioning of Vehicle 110 may be turned off, a circulation of the air conditioning of Vehicle 110 may be modified to circulate internal air within Vehicle 110, or the like.

Additionally or alternatively, the arrival to Polluted Area 140 may be delayed, such as by making a stop at one of the locations in Clean Area 130, slowing the vehicle, or the like. In some exemplary embodiments, the delay may be performed as a prevention action, in order to prevent the vehicle from entering Polluted Area 140 at very high air pollution levels. Determining whether to perform a delay as a prevention action may be performed based on the air pollution level at the polluted area at the expected arrival time being above a predetermined threshold, based on the air pollution level at the polluted area at a future time after the expected arrival time being lower than the air pollution level at the polluted area at the expected arrival time, or the like.

Additionally or alternatively, an alternative route may be determined to avoid entering the polluted area.

Figure 2:
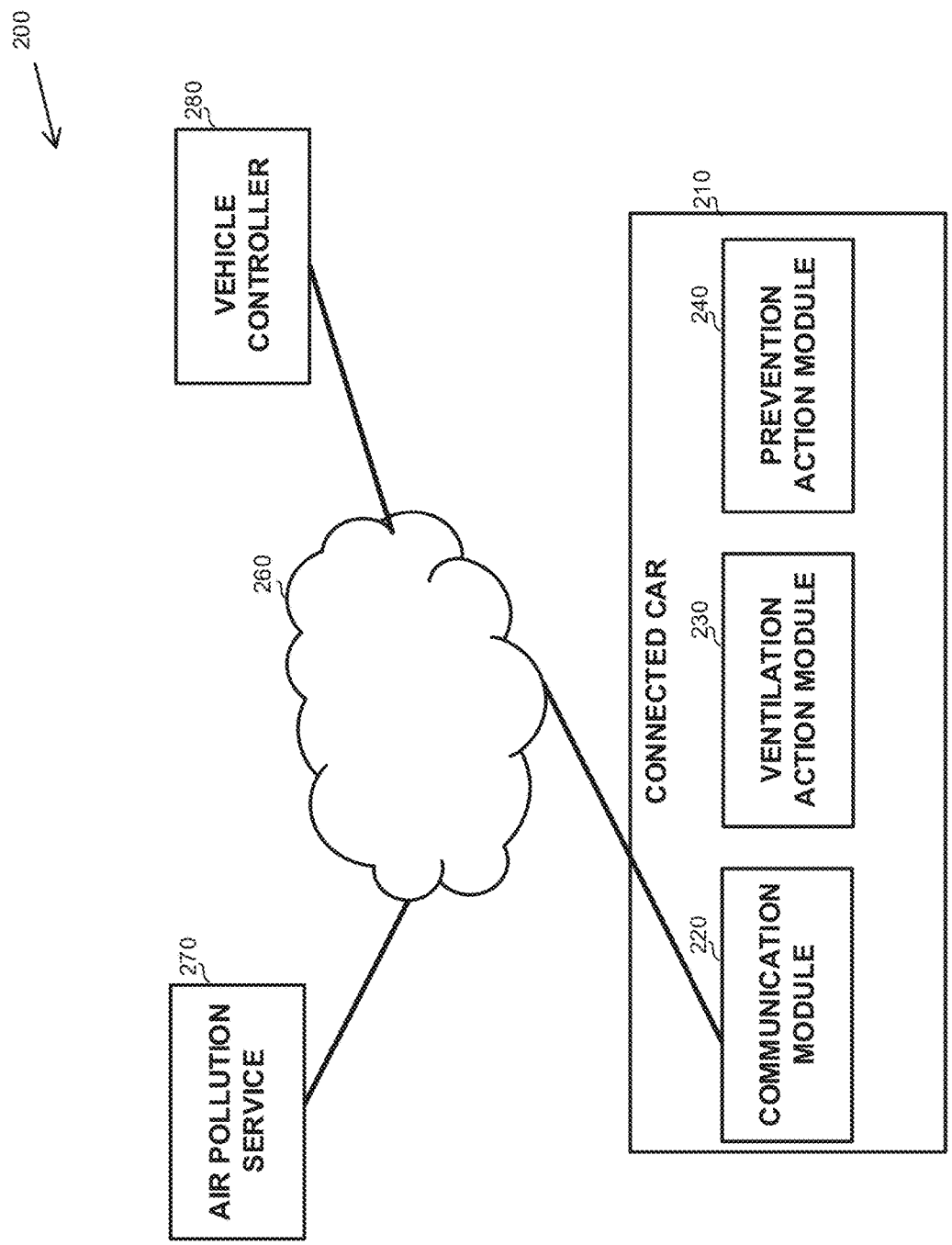
FIG. 2 shows a schematic illustration of an exemplary environment, in accordance with some exemplary embodiments of the disclosed subject matter.

Referring now to FIG. 2 showing a schematic illustration of an exemplary environment, in accordance with some exemplary embodiments of the disclosed subject matter.

A Connected Car 210 may be configured to automatically reduce health risk that may be caused by air pollution to passengers thereon, in accordance with the disclosed subject matter. In some exemplary embodiments, Connected Car 210 may be connected to a Vehicle Controller 280 and an Air Pollution Service module 270, via the Network 260, or any other network, connection module, or the like. Network 260 may be the Internet, an intranet, or the like. Additionally or alternatively, Connected Car 210 may be connected to a navigation system (not shown), a Global Positioning System (GPS), or the like. Additionally or alternatively, Connected Car 210 may be an autonomous vehicle capable of sensing its environment and moving safely with little or no human input. Connected Car 210 may comprise a variety of sensors to perceive their surroundings, such as radar, Lidar, sonar, GPS, odometry, inertial measurement units, or the like.

In some exemplary embodiments, Connected Car 210 may comprise a Communication Module 220. Communication Module 220 may be utilized to provide an output to and receive input from a user (not shown), Vehicle Controller 280, Air Pollution Service 270, or the like. In some exemplary embodiments, Vehicle Controller 280 may be utilized to control the automatic activation of ventilation and pollution prevention actions of Connected Car 210. Additionally or alternatively, Vehicle Controller 280 may be utilized to additional control tasks of Connected Car 210, such as to interpret sensory information to identify appropriate navigation paths, identifying obstacles and relevant signage, identifying health hazards, or the like.

In some exemplary embodiments, Communication Module 220 may be utilized to obtain a driving path of Connected Car 210. The driving path may be obtained from Vehicle Controller 280, from a navigation system of Connected Car 210, from a passenger riding Connected Car 210, from a computing device associated with Connected Car 210, or the like. The driving path may comprise the locations that Connected Car 210 is expected to arrive thereto. Additionally or alternatively, additional information related to the driving path may be obtained, such as information related to the locations, the expected times that Connected Car 210 is expected to arrive to each location, expected stops and durations thereon, or the like.

In some exemplary embodiments, Communication Module 220 may be utilized to obtain air pollution data from Air Pollution Service 270. The air pollution data may comprise an air pollution level at each location or several locations on the driving path of Connected Car 210.

In some exemplary embodiments, Air Pollution Service 270 may be configured to provide pollution data regarding Connected Car 210 and along driving path thereof to Vehicle Controller 280. Air Pollution Service 270 may be configured to obtain air pollution data from sensors located along the driving path of Connected Car 210, nearby the driving path of Connected Car 210, or the like. Additionally or alternatively, Air Pollution Service 270 may be configured to obtain the air pollution data from air pollution monitoring systems. Additionally or alternatively, Air Pollution Service 270 may be configured to predicted the air pollution data based on historical pollution data along the driving path. Air Pollution Service 270 may be configured to integrate location-based, real-time, outdoor air quality and pollen data, fire data, or the like, to predicted the air pollution data.

In some exemplary embodiments, Vehicle Controller 280 may be configured to predict, based on the air pollution data obtained from Air Pollution Service 270 and based on the driving path of Connected Car 210, that Connected Car 210 is about to encounter air pollution at a future location. Additionally or alternatively, Vehicle Controller 280 may be configured to predict, based on the air pollution data obtained from Air Pollution Service 270 and based on the driving path of Connected Car 210, that Connected Car 210 is expected to be located in location with low air pollution, without air pollution, or the like.

In some exemplary embodiments, Vehicle Controller 280 may be configured to determine that an air pollution level in a future location along the driving path of Connected Car 210 is above a predetermined threshold. Vehicle Controller 280 may be configured to estimate an arrival time of the vehicle to each future location on the driving path of Connected Car 210. Vehicle Controller 280 may be configured to predict an estimated air pollution level at each future location at the associated arrival time thereto.

Additionally or alternatively, Vehicle Controller 280 may be configured to determine that the driving path of Connected Car 210 comprises a future sub-path that Connected Car 210 is expected to arrive to at a future time, having an estimated air pollution level is below a threshold. Vehicle Controller 280 may be configured to estimate a time window that Connected Car 210 is expected to be located on the future sub-path. Vehicle Controller 280 may be configured to predict an estimated air pollution level at the future sub-path within the time window. Vehicle Controller 280 may be configured to predict a plurality of estimated air pollution levels along several locations within the future sub-path at respective expected arrival times thereto. Vehicle Controller 280 may be configured to compute the estimated air pollution level based on the plurality of estimated air pollution levels along the several locations.

In some exemplary embodiments, Vehicle Controller 280 may utilize different threshold for different situations. Vehicle Controller 280 may be configured to utilize a first threshold for determining when to instruct Prevention Action Module 240 to perform a prevention action and a second threshold for determining when to instruct Ventilation Action Module 230 to perform a ventilation action. The thresholds may be set based on an air pollution level at a passenger cabin of Connected Car 210, a desired air pollution level at a passenger cabin of Connected Car 210, or the like.

In some exemplary embodiments, Prevention Action Module 240 may be configured to perform a prevention action, in response to Vehicle Controller 280 predicting that Connected Car 210 is about to encounter air pollution at a future location. The prevention action may be configured to prevent the air pollution at the future location to reach a passenger cabin of Connected Car 210.

In some exemplary embodiments, Prevention Action Module 240 may be configured to perform the prevention action prior to Connected Car 210 reaching the future location. The prevention action may be performed at least a predetermined time prior to Connected Car 210 reaching the future location. The predetermined time may be determined by Vehicle Controller 280 such as based on the expected pollution level, may be manually set by user, or the like. The predetermined time may be set to be enough for preventing the air pollution at the future location to reach a passenger cabin of Connected Car 210, while consuming minimal time, resources or energy of Connected Car 210. As an example, the predetermined time may be about a minute, about 5 minutes, about 10 minutes, or the like.

In some exemplary embodiments, Prevention Action Module 240 may be configured to turn on an air purifier inside Connected Car 210 to reduce the air pollution at the passenger cabin of Connected Car 210. The air purifier may be turned on before or when reaching the future location, in order to prevent the air pollution to increase in the passenger cabin of Connected Car 210.

Additionally or alternatively, Prevention Action Module 240 may be configured to close one or more windows of Connected Car 210 in order to prevent the air pollution at the future location from reaching the passenger cabin of Connected Car 210. Prevention Action Module 240 may be configured to close a portion of the windows, all of the windows, partially close, or the like, according to the expected air pollution levels at the future location.

Additionally or alternatively, Prevention Action Module 240 may be configured to turn on an air conditioning of Connected Car 210, or modify the circulation thereof to circulate internal air within of Connected Car 210.

Additionally or alternatively, Prevention Action Module 240 may be configured to alert the driver of Connected Car 210 to slow down, to make a stop, or the like, in order to delay the entrance of Connected Car 210 to a polluted area, to prevent Connected Car 210 from arriving to a polluted area at a predetermined time frame with expected high air-pollution level, or the like.

Additionally or alternatively, Prevention Action Module 240 may be configured to compute an alternative route for Connected Car 210 to prevent Connected Car 210 from reaching a polluted area.

In some exemplary embodiments, Ventilation Action Module 230 may be configured to perform a ventilation action, in response to Vehicle Controller 280 predicting that Connected Car 210 is about arrive to a location with an air pollution below a threshold. The ventilation action may be configured to decrease the air pollution level inside the passenger cabin of Connected Car 210.

In some exemplary embodiments, Ventilation Action Module 230 may be configured to open one or more windows of Connected Car 210 in order to ventilate the passenger cabin of Connected Car 210. Ventilation Action Module 230 may be configured to open a portion of the windows, all of the windows, partially open, or the like, according to the expected air pollution levels at the future location.

Additionally or alternatively, Ventilation Action Module 230 may be configured to turn off an air conditioning of Connected Car 210, modify the circulation thereof to circulate external air into Connected Car 210.

In some exemplary embodiments, Ventilation Action Module 230 may be configured to stop the ventilation action before Connected Car 210 exits the future sub-path with the predicted air pollution below the threshold. It may be noted that in some cases, Ventilation Action Module 230 may avoid performing any ventilation action prior to entering the future sub-path.

Figure 3:
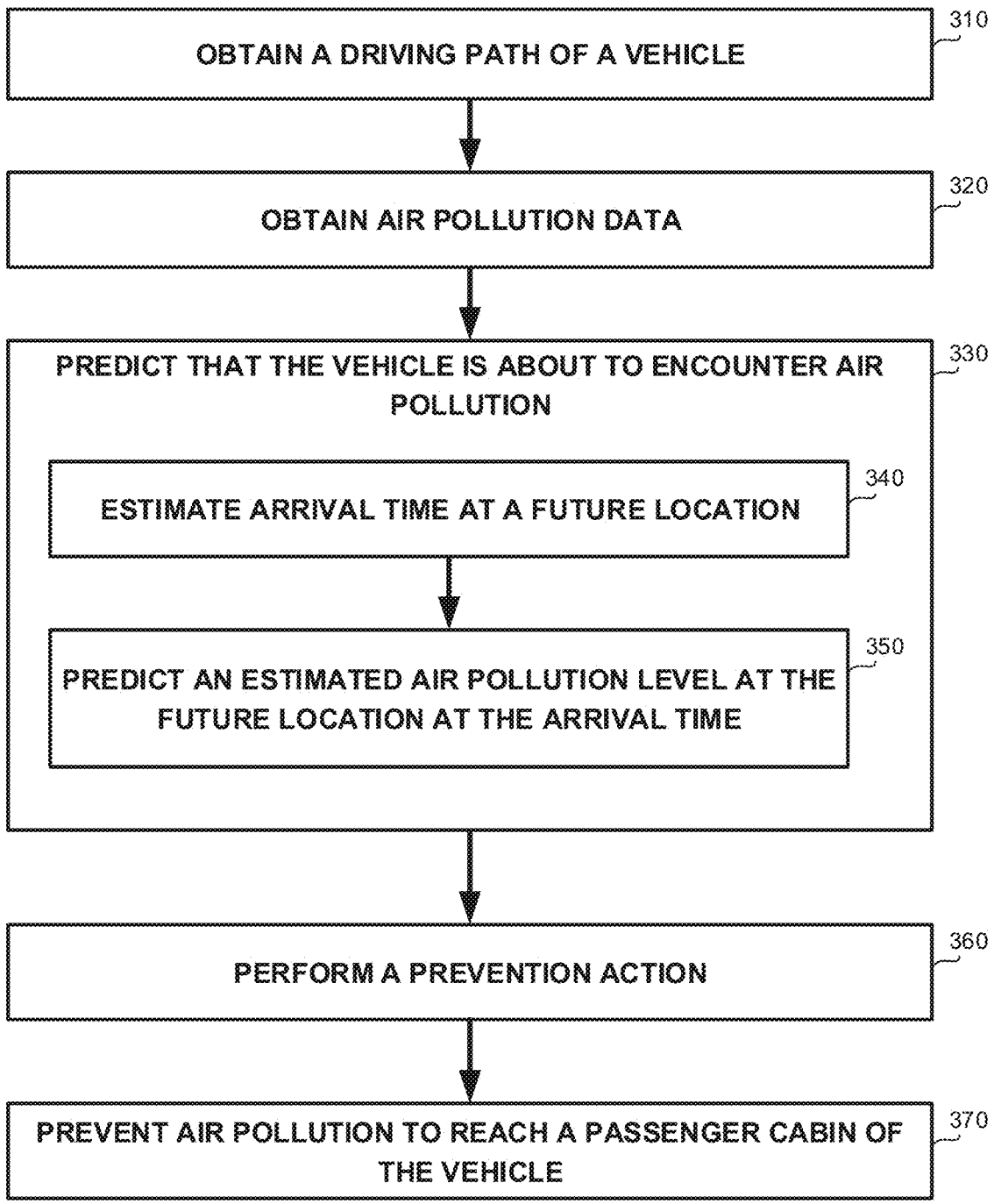
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter.

On Step 310, a driving path of a vehicle may be obtained. In some exemplary embodiments, the driving path may be obtained from a navigation platform of the vehicle, from a navigation app of a computing device associated with the vehicle, or the like. Additionally or alternatively, the driving path may be provided manually by a driver, may be updated dynamically based on a location of the vehicle, or the like. In some exemplary embodiments, the driving path may comprise a at least one future location that the vehicle is expected to arrive to at a future time.

On Step 320, air pollution data may be obtained. In some exemplary embodiments, the air pollution data may comprise an air pollution level at the at least one future location. Additionally or alternatively, the air pollution data may comprise historical air pollution levels along the driving path, real-time pollution levels, or the like. In some exemplary embodiments, the air pollution data may comprise measured air pollution levels such as air pollution levels measured by sensors or monitored air pollutants, estimated air pollution levels such as air pollution levels estimated based on existences of air pollution sources, predicted air pollution levels such as based on similar locations or historical data, or the like.

On Step 330, a prediction that the vehicle is about to encounter air pollution at the at least one future location may be performed. In some exemplary embodiments, the prediction may be performed based on the air pollution data and based on the driving path. In some exemplary embodiments, the prediction may comprise determining that an air pollution level is above a predetermined threshold.

As an example, a BreezoMeter™ Air Quality Index (BAQI) for measuring real-time air quality information may be utilized. BAQI may have with a scale range between 0, indicating poor air quality, e.g., a high air pollution, to 100, indicting an excellent air quality, e.g., no air pollution, the predetermined threshold may be about 50, about 40, about 30, or the like. An air pollution level above a predetermined threshold, e.g., and air quality measurement below the BAQI predetermined threshold, may be indicative of a risky air pollution.

On Step 340, an arrival time at a future location may be estimated. In some exemplary embodiments, the arrival time may be determined based on the driving path, based on the velocity of the vehicle, based on traffic conditions along the driving path, or the like. Additionally or alternatively, the arrival time may be determined by a navigation system of the vehicle, a navigation application, or the like.

On Step 350, an air pollution level at the future location at the arrival time may be estimated.

In some exemplary embodiments, the prediction may be performed based on historical pollution data along the driving path. As an example, the future location may be predicted to encounter a certain air pollution level at the estimated arrival time thereto, based on historical air pollution levels at the future location on similar day hours, with similar traffic situation, with similar whether conditions, or the like.

On Step 360, a prevention action may be performed prior to the vehicle reaching the at least one future location. In some exemplary embodiments, the prevention action may comprise turning on an air purifier inside the vehicle, closing one or more windows of the vehicle, turning on an air conditioning of the vehicle, modifying a circulation of the air conditioning of the vehicle to circulate internal air within the vehicle, stopping the vehicle or reducing the speed of the vehicle in order to delay arrival to the polluted are, or the like.

In some exemplary embodiments, the prevention actions may be performed at least a predetermined time prior to the vehicle reaching the at least one future location. The predetermined time may be determined based on the prevention action, the air pollution level, passengers preferences, or the like. As an example, a time period of making a stop at a clean location, or the speed of the vehicle towards the expected polluted area, may be determined based on the air pollution level at the future location at the arrival time and air pollution levels at the future location at different arrival time points.

On Step 370, air pollution at the at least one future location may be prevented to reach a passenger cabin of the vehicle.

Figure 4:
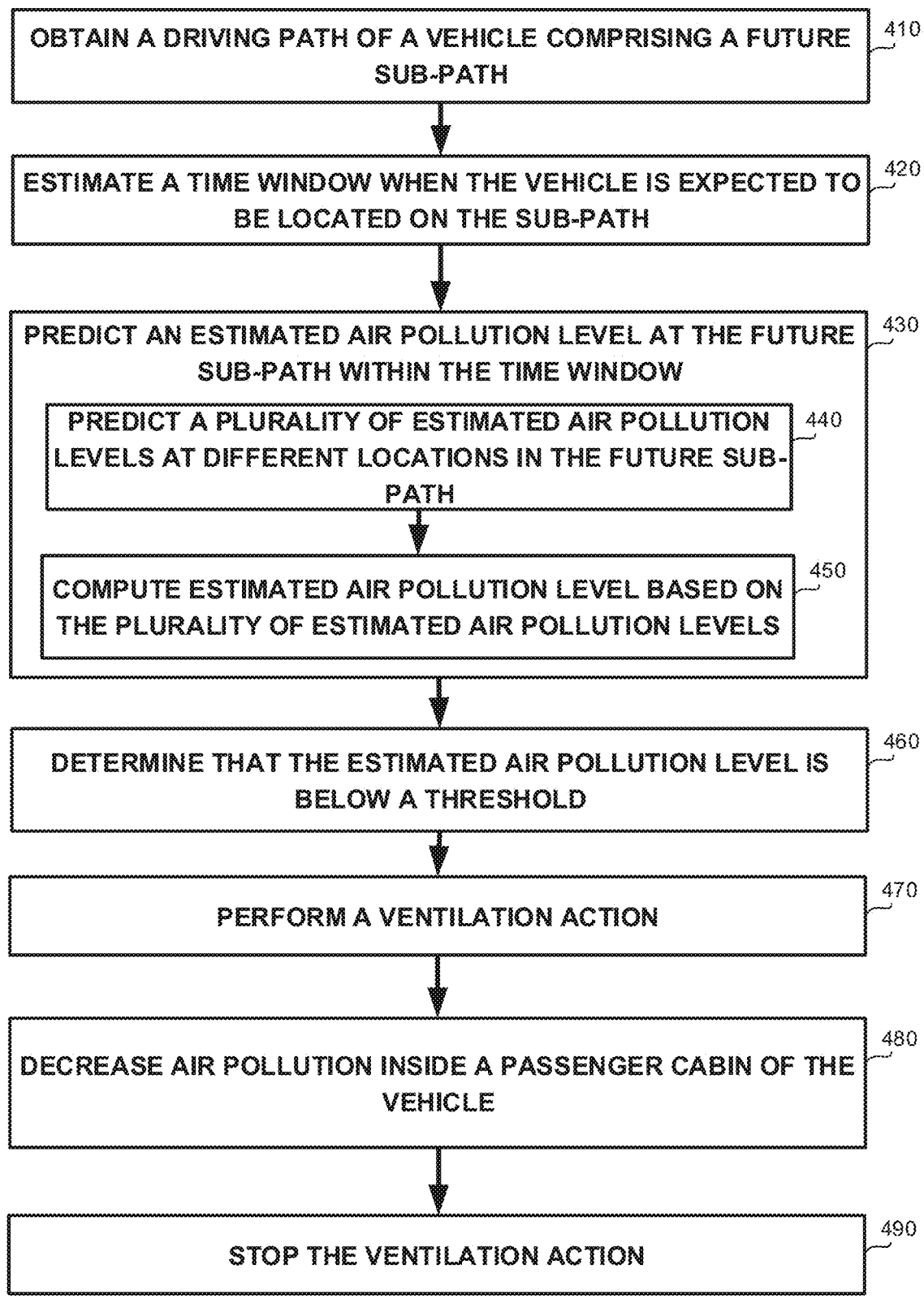
FIG. 4 shows a flowchart diagram of a method, in accordance with some exemplary embodiments of the disclosed subject matter.

Referring now to FIG. 4 showing a flowchart diagram of a method, in accordance with some exemplary embodiments of the disclosed subject matter.

On Step 410, a driving path of a vehicle may be obtained. In some exemplary embodiments, the driving path may comprise a future sub-path that the vehicle is expected to arrive to at a future time.

On Step 420, a time window when the vehicle is expected to be located on the future sub-path may be estimated. In some exemplary embodiments, the time window may be determined based on traffic information, based on the vehicle's properties, based on driver properties, or the like.

On Step 430, an estimated air pollution level at the future sub-path within the time window may be estimated. In some exemplary embodiments, the estimated air pollution level may be determined based on an estimated air pollution level at the beginning of the future sub-path. Additionally or alternatively, the estimated air pollution level may be determined based on a plurality of estimated air pollution levels along several different locations within the future sub-path.

On Step 440, a plurality of estimated air pollution levels along several different locations within the future sub-path at respective expected arrival times thereto may be predicted. In some exemplary embodiments, the arrival time to each location may be estimated. The locations may be predetermined locations, such as predetermined stations, locations with predetermined distance therebetween, or the like. Additionally or alternatively, the locations may be arbitrary locations, or the like. An estimated air pollution level at each location at the respective expected arrival time thereto may be predicted.

On Step 450, an estimated air pollution level may be computed based on the plurality of air pollution levels. In some exemplary embodiments, the estimated air pollution level may be an average of the plurality of air pollution levels, may be the maximal pollution level of the plurality of air pollution levels, or the like.

On Step 460, a determination that the estimated air pollution level is below a threshold may be performed. In some exemplary embodiments, the threshold may be based on an air pollution level at a passenger cabin of the vehicle. As an example, the threshold may be equal to the air pollution level at the passenger cabin of the vehicle.

On Step 470, a ventilation action may be performed while the vehicle is located on the future sub-path. In some exemplary embodiments, the ventilation action may comprise opening one or more windows of the vehicle, turning on an air conditioning of the vehicle, modifying a circulation of the air conditioning of the vehicle to circulate external air into the vehicle, or the like.

On Step 480, air pollution inside a passenger cabin of the vehicle may be decreased. In some exemplary embodiments, the composition of the air inside the passenger cabin may be transformed to reduce pollens therein.

On Step 490, the ventilation action may be stopped before the vehicle exits the future sub-path, such as by closing the one or more windows of the vehicle, turning off the air conditioning of the vehicle, modifying the circulation of the air conditioning of the vehicle back to circulate external air outside the vehicle, or the like.

In some exemplary embodiments, the ventilation action may be stopped before the vehicle exits the future sub-path in order to preserve the air quality achieved inside the passenger cabin of the vehicle, as an example, the ventilation action may be stopped few minutes before existing the future sub-path, immediately before existing the future sub-path, or the like.

Additionally or alternatively, an optimal time period for performing the ventilation action, within the time the vehicle is located on the future sub-path, may be determined. The optimal time period may be determined based on the estimated air pollution level at the future sub-path, may be determined based on the type of the performed ventilation action and the time required thereby to achieve a desired air quality level, or the like. Additionally or alternatively, the ventilation action may be alternately performed and stopped along the future sub-path based on the plurality of estimated air pollution levels at the different locations in the future sub-path.

Additionally or alternatively, the ventilation action may be gradually stopped before the vehicle exits the future sub-path. As an example, if the ventilation action is opening one or more windows of the vehicle, gradually stopping the ventilation action may comprise gradually closing the one or more windows, closing a portion of the windows at a first time point and the remainder at a second time point, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A method comprising:
  obtaining a driving path of a vehicle, wherein the driving path comprises a at least one future location that the vehicle is expected to arrive to at a future time;
  obtaining air pollution data, wherein the air pollution data comprises an air pollution level at the at least one future location;
  predicting, based on the air pollution data and based on the driving path, that the vehicle is about to encounter air pollution at the at least one future location; and
  in response to said predicting, performing a prevention action prior to the vehicle reaching the at least one future location, wherein the prevention action comprises intentionally delaying an arrival of the vehicle to the at least one future location by increasing a driving duration of the vehicle before reaching the at least one future location, wherein said intentionally delaying the arrival comprises:

estimating an estimated air pollution level at the at least one future location in a future time;

determining that the estimated air pollution level at the at least one future location in a future time is below a predetermined threshold; and causing the vehicle to arrive to the at least one future location at the future time, whereby the vehicle reaches the at least one future location at the future it and does not encounter air pollution at the at least one future location;

predicting an estimated air pollution level at the future sub-path within the time window; and in response to a determination that the estimated air pollution level is below a threshold, intentionally delaying an exit of the vehicle from the future sub-path by increasing a driving duration of the vehicle within the future sub-path, wherein said intentionally delaying the exit comprises:

estimating an estimated air pollution level within the vehicle in an updated exit time of the vehicle from the future sub-path;

determining that the estimated air pollution level within the vehicle in the updated exit time of the vehicle from the future sub-path is below a predetermined threshold; and causing the vehicle to exit from the future sub-path at the updated exit time.

2. The method of claim 1, wherein said predicting comprises determining that an air pollution level is above the predetermined threshold.

3. The method of claim 1, herein said predicting comprises:

estimating an arrival time of the vehicle to the at least one future location; and predicting, based on the air pollution data, an estimated air pollution level at the at least one future location at the arrival time.

4. The method of claim 1, wherein said performing of the prevention action is performed at or before a predetermined time prior to the vehicle reaching the at least one future location.

5. The method of claim 1, wherein the prevention action further comprises performing at least one of:

turning on an air purifier inside the vehicle closing one or more windows of the vehicle; turning on an air conditioning of the vehicle; and modifying a circulation of the air conditioning of the vehicle to circulate internal air within the vehicle.

6. The method of claim 1, wherein said delaying the arrival of the vehicle to the at least one future location comprises:

estimating, based on the air pollution data, that the air pollution level at the at least one future location is about to be below the predetermined threshold at a second future time; and modifying the driving path of the vehicle to cause the vehicle to arrive to the future location at the second future time instead of at the future time.

7. The method of claim 1 wherein the prevention action is configured to prevent the air pollution at the at least one future location to reach a passenger cabin of the vehicle.

8. The method of claim 1, wherein said predicting is further performed based on historical pollution data along the driving path.

9. The method of claim 1, wherein said predicting is performed based on real-time pollution data along the driving path.

10. The method of claim 1, wherein the driving duration of the vehicle before reaching the at least one future location is increased by at least one of:

increasing a driving distance of the vehicle, whereby the vehicle driving for a longer distance; and adding a stop to the driving path at an intermediate location prior to reaching the at least one future location, wherein the intermediate location, wherein air pollution level at the intermediate location is below a level of the air pollution that the vehicle is predicted to encounter at the at least one future location.

11. A method comprising:

obtaining a driving path of a vehicle, wherein the driving path comprises a future sub-path that the vehicle is expected to arrive to at a future time;

estimating a time window when the vehicle is expected to be located on the future sub-path;

predicting an estimated air pollution level at the future sub-path within the time window;

determining an air pollution level at a passenger cabin of the vehicle, wherein the air pollution level at the passenger cabin of the vehicle is determined based on a second air pollution level at a second passenger cabin of a second vehicle, wherein the second vehicle drives in the driving path of the vehicle, wherein the vehicle and the second vehicle have a same ventilation status over the driving path;

in response to a determination that the estimated air pollution level is below a threshold, intentionally delaying an exit of the vehicle from the future sub-path by increasing a driving duration of the vehicle within the future sub-path, wherein said intentionally delaying the exit comprises:

estimating an estimated air pollution level within the vehicle in an updated exit time of the vehicle from the future sub-path;

determining that the estimated air pollution level within the vehicle in the updated exit time of the vehicle from the future sub-path is below a predetermined threshold; and performing an action based on the estimated air pollution level at the future sub-path within the time window and based on the air pollution level at a passenger cabin of the vehicle, wherein the action comprises causing the vehicle to exit from the future sub-path at the updated exit time.

12. The method of claim 11, wherein said predicting the estimated air pollution level comprises:

predicting a plurality of estimated air pollution levels along several locations within the future sub-path at respective expected arrival times thereto; and computing the estimated air pollution level based on the plurality of estimated air pollution levels along the several locations.

13. The method of claim 11, wherein said performing the action further comprises in response to a determination that the estimated air pollution level is below the threshold, performing a ventilation action while the vehicle is located on the future sub-path, wherein the method further comprising stopping the ventilation action, wherein said stopping is performed before the vehicle exits the future sub-path.

14. The method of claim 11, Wherein the action comprises performing at least one of:

opening one or more windows of the vehicle;
turning on an air conditioning of the vehicle; and
modifying a circulation of the air conditioning of the vehicle to circulate external air into the vehicle.

15. The method of claim 11, wherein the action is a ventilation action that is configured to decrease an air pollution level inside the passenger cabin of the vehicle.

16. A computerized apparatus having a processor, the processor being adapted to perform the steps of:
   obtaining a driving path of a vehicle, wherein the driving path comprises a at least one future sub-path that the vehicle is expected to arrive to at a future time and at least one future location that the vehicle is expected to arrive to at a later time;
   estimating a time window when the vehicle is expected to be located on the at least one future sub-path;
   obtaining air pollution data, wherein the air pollution data comprises an air pollution level at the at least one future sub-path and at the at least one future location;
   predicting, based on the air pollution data and based on the driving path, that the vehicle is about to encounter air pollution at the at least one future location;
   in response to said predicting, performing a prevention action prior to the vehicle reaching the at least one future location, wherein the prevention action comprises intentionally delaying an arrival of the vehicle to the at least one future location by increasing a driving duration of the vehicle before reaching the at least one future location, wherein said intentionally delaying the arrival comprises:
   estimating an estimated air pollution level at the at least one future location in a future time;
   determining that the estimated air pollution level at the at least one future location in a future time is below a predetermined threshold; and
   causing the vehicle to arrive to the at least one future location at the future time, whereby the vehicle reaches the at least one future location at the future time and does not encounter air pollution at the at least one future location;
   predicting an estimated air pollution level at the future sub-path within the time window; and
   in response to a determination that the estimated air pollution level is below a threshold, intentionally delaying an exit of the vehicle from the future sub-path by increasing a driving duration of the vehicle within the future sub-path, wherein said intentionally delaying the exit comprises:
   estimating an estimated air pollution level within the vehicle in an updated exit time of the vehicle from the future sub-path;
   determining that the estimated air pollution level within the vehicle in the updated exist time of the vehicle from the future sub-path is below a predetermined threshold; and
   causing the vehicle to exit from the future sub-path at the updated exit time.

17. A computer program product comprising a non-transitory computer readable storage medium retaining program instructions, which program instructions when read by a processor, cause the processor to perform a method comprising:
   obtaining a driving path of a vehicle, wherein the driving path comprises a at least one future sub-path that the vehicle is expected to arrive to at a future time and at least one future location that the vehicle is expected to arrive to at a later time;
   estimating a time window when the vehicle is expected to be located on the at least one future sub-path;
   obtaining air pollution data, wherein the air pollution data comprises an air pollution level at the at least one future sub-path and at the at least one future location;
   predicting, based on the air pollution data and based on the driving path, that the vehicle is about to encounter air pollution at the at least one future location;
   in response to said predicting, performing a prevention action prior to the vehicle reaching the at least one future location, wherein the prevention action comprises intentionally delaying an arrival of the vehicle to the at least one future location by increasing a driving duration of the vehicle before reaching the at least one future location, wherein said
   intentionally delaying the arrival comprises:
   estimating an estimated air pollution level at the at least one future location in a future time;
   determining that the estimated air pollution level at the at least one future location in a future time is below a predetermined threshold; and
   causing the vehicle to arrive to the at least one future location at the future time, whereby the vehicle reaches the at least one future location at the future time and does not encounter air pollution at the at least one future location;
   predicting an estimated air pollution level at the future sub-path within the time window; and
   in response to a determination that the estimated air pollution level is below a threshold, intentionally delaying an exit of the vehicle from the future sub-path by increasing a driving duration of the vehicle within the future sub-path, wherein said intentionally delaying the exit comprises;
   estimating an estimated air pollution level within the vehicle in an updated exit time of the vehicle from the future sub-path;
   determining that the estimated air pollution level within the vehicle in the updated exit time of the vehicle from the future sub-path is below a predetermined threshold; and
   causing the vehicle to exit from the future sub-path at the updated exit time.

\* \* \* \* \*